Aug. 5, 1924.  
R. J. MAJORS ET AL  
COMBINED SAND AND WATER TRAP  
Filed Oct. 25, 1921

1,503,544

INVENTORS.
ROBERT J. MAJORS.
& HARRY ANDERSON
by Frank Waterfield
ATTORNEY.

Patented Aug. 5, 1924.

1,503,544

UNITED STATES PATENT OFFICE.

ROBERT J. MAJORS AND HARRY ANDERSON, OF COALINGA, CALIFORNIA.

COMBINED SAND AND WATER TRAP.

Application filed October 25, 1921. Serial No. 510,348.

*To all whom it may concern:*

Be it known that we, ROBERT J. MAJORS and HARRY ANDERSON, citizens of the United States, and residents of Coalinga, in the county of Fresno, State of California, have invented certain new and useful Improvements in Combined Sand and Water Traps, of which the following is a specification.

Our invention relates to a combined sand and water trap for use in oil wells and the object thereof is to produce a trap of that character which will automatically separate the sand and water from the oil as the same is pumped from the well.

Another object is to produce a device of the above character which can be easily and quickly cleansed of the sand and water at the will of the operator.

A still further object is to provide means in a device of the above character for indicating the amount of water contained therein visually and to provide means for easily and quickly flushing the sand therefrom.

Other objects and advantages will appear hereinafter and, while we have shown and will describe the preferred form of our invention, it will be understood that we do not limit ourselves to such preferred form but that various changes and adaptations may be made therein without departing from the spirit of our invention.

In the drawings acompanying and forming a part hereof:

Figure 1:
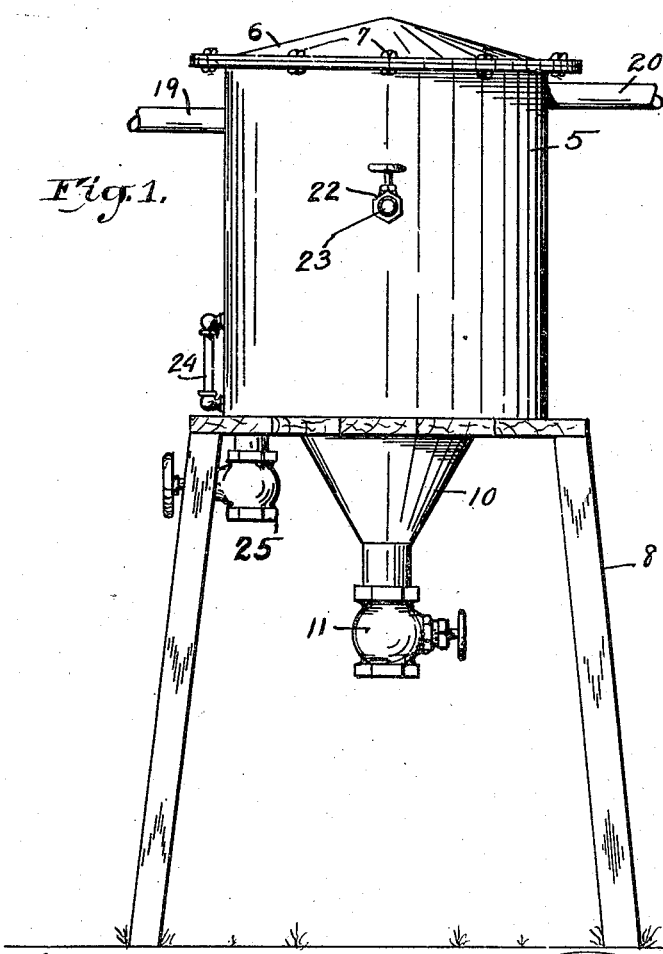
Fig. 1 is a side elevation of our invention in its position of use.
Figure 2:
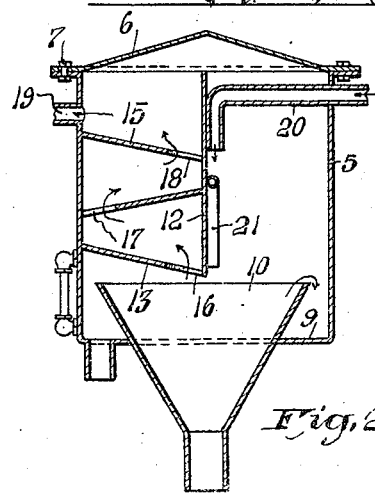
Fig. 2 is a central vertical section through the trap.
Figure 3:
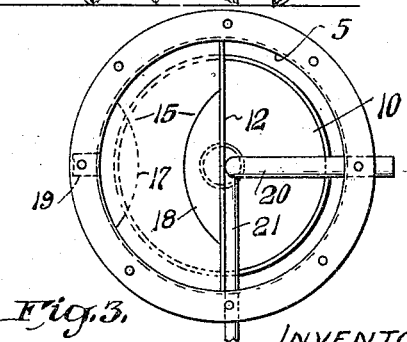
Fig. 3 is a top plan of Fig. 2.

Referring to the drawings our invention comprises an outer tubular casing or drum 5 closed at the top by a cover 6 removably secured thereto by bolts 7, and being supported at a suitable distance above the ground by a foundation 8. Mounted centrally of the bottom 9 of casing 5, preferably integral therewith, is a funnel 10 which projects a distance from each side of said bottom 9 and upon the lower smaller end of said funnel is mounted a valve or shut off cock 11 by means of which the outlet from said funnel is controlled. The upper end of said funnel extends upwardly and outwardly and terminates at a point to provide a narrow concentric space between it and the sides of said casing. Dividing casing 5 vertically is a partition 12, which extends from a point a short distance above the upper termination of funnel 10 to a point near the top of said casing 5, and extending from one side of said partition to the opposed wall of casing 5 are baffles 13, 14 and 15. Baffles 13, 14 and 15 are provided with openings 16, 17 and 18 therethrough through which the oil is permitted to flow on its passage out of the trap. It will be noticed that baffles 13, 14 and 15 are mounted angularly to the partition and wall of the casing and that the openings therein are at the lower termination thereof the purpose of which will be hereafter explained, and that we have shown three baffles but we wish it understood that more or less of said baffles may be used if desired. Extending from the side of casing 5 just above the upper termination of the uppermost baffle is a pipe 19 which communicates with the interior of said casing and conducts the oil therefrom to its place of storage. Projecting through the side of casing 5 on the opposite side of the partition 12 to the baffles 13, 14 and 15, is a supply pipe 20 the inner end of which is bent to extend downwardly and is secured to said partition centrally of said casing 5. The other end of said supply pipe 20 is connected to a source of supply, not shown. Extending through the side of casing 5 parallel with partition 12 is a pipe 21 the inner end of which is bent to extend downwardly and is secured to said partition centrally of the casing 5.

The outer end of pipe 21 has mounted thereon a shut off cock 22 which cock is in turn connected by a pipe 23 to a water supply, not shown, and provides means for flushing out the sand in funnel 10 when desired. Mounted in the side of casing 5 near the lower end thereof is a gage glass 24 which indicates the height of the water in the casing 5.

In the bottom 9 of casing 5, near the edge thereof, is provided a bleeder valve 25 by means of which the water in casing 5 may be permitted to escape.

In the operation of our trap oil will enter the casing 5 through the supply pipe 20, it being understood that the valves 25, 11 and 22 will be closed, and will flow into funnel 10 until the same is filled, when it will overflow into casing 5 and as the height of the oil rises within said casing it will flow upwardly through the openings 16, 17 and 18 in baffles 13, 14 and 15 and thence out through pipe 19 to its place of use or storage. As the oil flows into the casing the sand contained therein, being of greater specific gravity than the oil and water, will fall to the bottom of said funnel and as the oil flows over the top of the funnel the water contained therein, being of greater specific gravity than the oil, will settle at the bottom of casing 5 from whence it is drawn by the bleeder valve when the gage glass indicates the necessity therefor. As the oil flows upwardly through the openings in the baffles any sand still carried by the oil will fall upon said baffles and, by reason of the angular inclination thereof will slide down the same into the funnel. When it is desired to remove the accumulated sand in the funnel, valve 11 is opened at the bottom of said funnel, and valve 22 is also opened permitting a stream of water to flow upon said sand and funnel and flush the same out through opening cock 11.

Having described our invention what we claim is:

1. A combined sand and water trap comprising a tank; means to supply oil into said tank; a partition within said tank extending from side to side and from the top to near the bottom thereof; a plurality of baffles extending from said partition to the side of said tank and being disposed at an angle thereto, said baffles being on the opposite side of said partition to said oil supply; an outlet for the oil above said baffles; a sand receptacle in the bottom of said tank concentric therewith and spaced therefrom; an outlet in said receptacle for said sand; a closure for said opening; and an outlet in the bottom of said tank; and a closure for said opening.

2. A combined sand and water trap comprising a tank; an oil supply for said tank; a partition within said tank extending from side to side and from the top to near the bottom thereof; a plurality of baffles extending from said partition to the side of said tank and being disposed at an angle thereto and being on the opposite side of said partition to said oil supply; an outlet for the oil above said baffles; a sand receptacle mounted in the bottom of said tank extending upwardly therefrom concentric therewith and spaced therefrom; an opening in the bottom of said receptacle; a closure for said opening; an outlet in the bottom of said tank at the edge thereof; a closure for said last opening; a flush pipe extending through the side of said tank having its inner end bent to extend downwardly centrally of said tank; a water supply for said flush pipe; a control valve for said water supply; an indicating gage on the side of said tank; and a detachable cover for said tank.

3. A sand and water trap comprising a tank a support for said tank; a funnel mounted in the bottom of said tank to project from each side thereof concentric therewith, the upper end of said funnel being spaced a short distance from the side of said tank; a control valve for the lower end of said funnel; an outlet in the lower end of said tank at the side of said funnel; a control valve for said outlet; a partition within said tank extending from side to side and from the top thereof to near the top of said funnel; a plurality of angularly disposed baffles extending between said partition and the side of said tank, the alternate baffles being disposed oppositely to each other; an outlet in the side of said tank near the upper termination of the uppermost baffle; a connection from said outlet to a place of use; a supply pipe extending through the side of said tank opposite said outlet having its inner end bent to extend downwardly, centrally of said tank; a flush pipe extending through and having its inner end bent to extend downwardly, centrally of said tank; a connection from said flush pipe to a water supply; a control valve for said flush pipe; means mounted on the side of said tank to indicate the height of a fluid therein; and a detachable closure for the upper end of said tank.

4. A sand and water trap comprising a tank; a vertically extending partition dividing said tank centrally and extending from the top to near the bottom thereof; angularly disposed baffles in said tank at one side of said partition; a sand receptacle at the bottom of said tank concentric therewith but spaced therefrom; a connection from the lower end of said receptacle to atmosphere; a closure for said connection; an oil supply for said tank at the side of said partition opposite said baffles; an oil outlet for said tank at the other side of said partition; an outlet at the bottom of said tank at the side of said sand receptacle; and a closure for said last outlet.

5. A sand and water trap comprising a tank; a support for said tank; an inverted cone-shaped sand receptacle in the bottom of said tank, concentric therewith but spaced therefrom; a control valve for the lower end of said receptacle; a vertically extending partition dividing said tank centrally, extending from the top to near the top of said sand receptacle; angularly disposed baffles extending from one side of said partition to the side of said tank; an oil supply for said tank at the side of said partition opposite the said baffles; an outlet for said oil at the opposite side of said partition; a detachable closure for the upper end of said tank; an outlet pipe in the bottom of said tank at the side of said sand receptacle;

a closure for said outlet pipe; a flush pipe extending through the wall of said tank parallel with said partition and being bent to extend downwardly centrally of said sand receptacle.

6. A combined sand and water trap comprising a tank; means to supply oil to said tank; a partition dividing said tank vertically and centrally extending from the top to near the bottom thereof; baffles extending from one side of said partition to the side of said tank, the openings in said baffles being in staggered relation to each other; a funnel-shaped sand receptacle mounted in the bottom of said tank to project from opposite sides thereof and having its lower end extending to atmosphere; means to cut off said connection from atmosphere; indicating means for indicating the fluid level in said tank; a bleeder opening in the bottom of said tank at the side of said sand receptacle; a valve for controlling said bleeder opening and an outlet for said oil supply.

7. A sand and water trap comprising a receptacle divided vertically into two compartments; a connection between said compartments at the lower end of said receptacle; partitions extending from one side of said dividing partition to the opposite side of said tank and being disposed to incline downwardly in opposite directions; openings in said last partitions at the lowermost points thereof; an oil supply for said receptacle at the side of said partition opposite said second partitions; an outlet from said tank on the opposite side of said dividing partition; a funnel-shaped sand receptacle mounted in the bottom of said tank to project from opposite sides thereof, the lower end of said receptacle extending to atmosphere; a closure for the lower end of said receptacle; an outlet in the bottom of said tank at the side of said funnel; a control valve for said opening; and a water supply for said sand receptacle.

8. A sand and water trap comprising two compartments in communication at their lower ends; an inlet at the upper end of one of said compartments; an outlet at the upper end of the other compartment; angularly disposed baffles extending across one of said compartments; a sand receptacle at the lower end of said compartments common to both; said receptacle being spaced at a distance from the bottom and sides of said tank; an outlet from said sand receptacle to atmosphere; a closure for said outlet; a flush pipe for said sand receptacle; an outlet at the bottom of one of said compartments at the side of said receptacle; and a closure for said last outlet.

In witness that we claim the foregoing we have hereunto subscribed our names this 27th day of September, 1921.

R. J. MAJORS.
HARRY ANDERSON.